US007240278B2

(12) United States Patent
Matsuo

(10) Patent No.: US 7,240,278 B2
(45) Date of Patent: Jul. 3, 2007

(54) INFORMATION DISPLAY CONTROL APPARATUS AND RECORDING MEDIUM HAVING RECORDED INFORMATION DISPLAY CONTROL PROGRAM

(75) Inventor: Shoji Matsuo, Hamura (JP)

(73) Assignee: Casio Computer Co., Ltd., Tokyo (JP)

( * ) Notice: Subject to any disclaimer, the term of this patent is extended or adjusted under 35 U.S.C. 154(b) by 439 days.

(21) Appl. No.: 10/745,054

(22) Filed: Dec. 22, 2003

(65) Prior Publication Data

US 2004/0139056 A1 Jul. 15, 2004

(30) Foreign Application Priority Data

Dec. 27, 2002 (JP) ............................. 2002-380755

(51) Int. Cl.
*G06F 15/00* (2006.01)
(52) U.S. Cl. ........................... 715/500; 715/532; 707/2
(58) Field of Classification Search ................ 715/541; 707/3
See application file for complete search history.

(56) References Cited

U.S. PATENT DOCUMENTS 6,154,758 A * 11/2000 Chiang ...................... 715/541
6,490,576 B1 * 12/2002 Nishiguchi ................ 707/3

FOREIGN PATENT DOCUMENTS

| JP | 63-208919 A | 8/1988 |
| JP | 6-259442 A | 9/1994 |
| JP | 7-85058 A | 3/1995 |
| JP | 8-314910 A | 11/1996 |
| JP | 2000-231559 A | 8/2000 |
| JP | 2001-67368 A | 3/2001 |
| JP | 2001-134585 A | 5/2001 |

* cited by examiner

*Primary Examiner*—Sam Rimell
*Assistant Examiner*—Paul Kim
(74) *Attorney, Agent, or Firm*—Frishauf, Holtz, Goodman & Chick, P.C.

(57) ABSTRACT

In response to a jumping operation in which a word appearing in an explanatory description read from a Chinese-Japanese dictionary is specified as a jump word, language information on the jump word is read, and the jump word is converted to the corresponding all-purpose character codes by using an all-purpose character code/Chinese-Japanese dictionary local character code conversion table for the language information on the jump word. Further, the all-purpose character codes of the jump word are converted to the corresponding existing local character codes by using an all-purpose character code/existing local character code conversion table for the language information. Jump-enabled destination dictionaries are then extracted based on the language information, a headword matching the jump word is retrieved in a jump destination dictionary selected from the extracted jump-enabled destination dictionaries, and the corresponding explanatory description is then displayed.

4 Claims, 15 Drawing Sheets

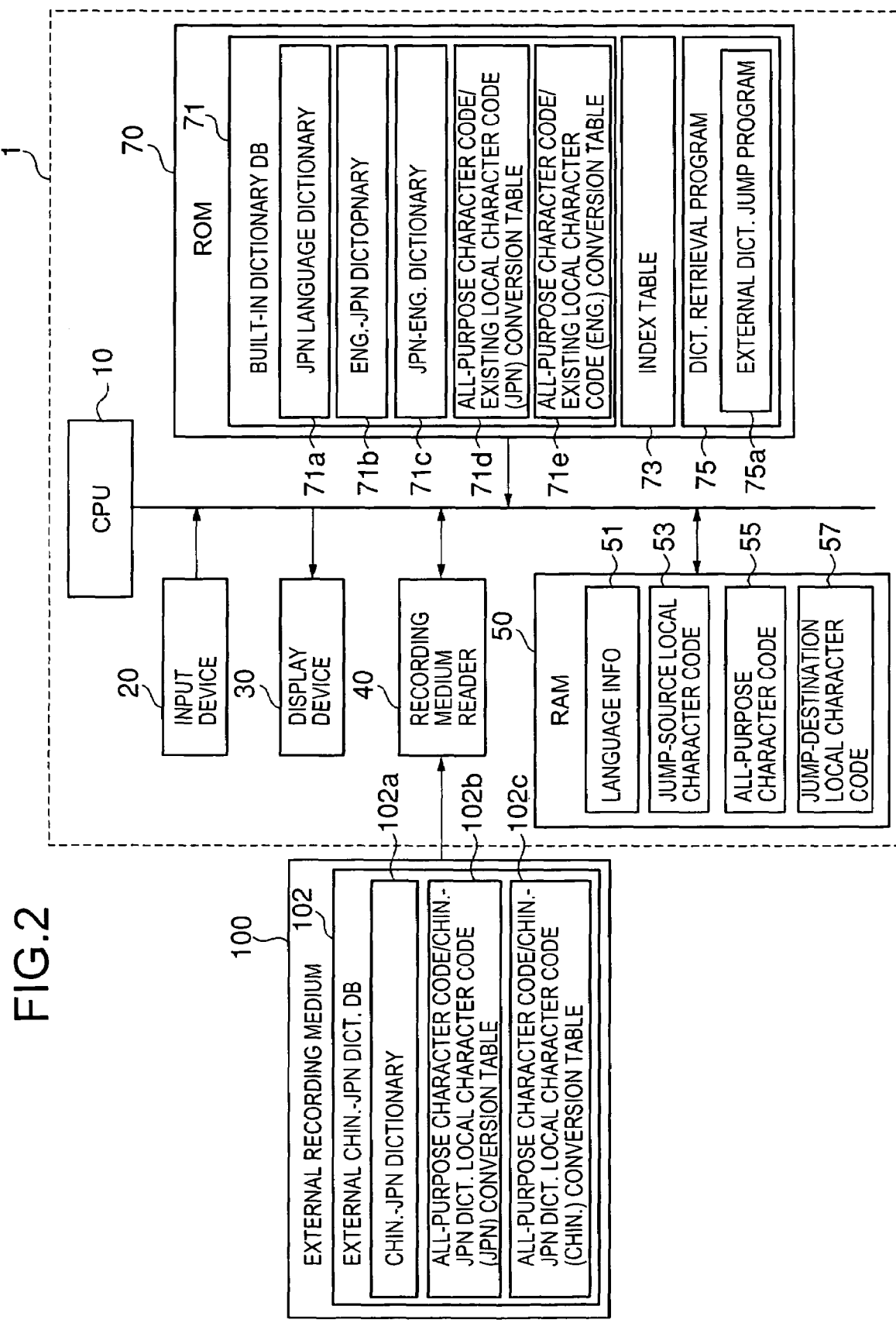

| HEADWORD DATA || EXPLANATORY DESCRIPTION DATA ||
|---|---|---|---|
| HEADWORD | LANGUAGE INFO | EXPLANATORY DESCRIPTION DATA | LANGUAGE INFO |
| ⋮ | ⋮ | ⋮ | ⋮ |
| 歓迎 | JAPANESE | よろこび迎えること。 ‥‥‥ | JAPANESE |
| | | ⋮ | ⋮ |
| ⋮ | ⋮ | ⋮ | ⋮ |

| HEADWORD DATA || EXPLANATORY DESCRIPTION DATA ||
|---|---|---|---|
| HEADWORD | LANGUAGE INFO | EXPLANATORY DESCRIPTION DATA | LANGUAGE INFO |
| ⋮ | ⋮ | ⋮ | ⋮ |
| 欢迎 | CHINESE | 歓迎する ‥‥‥ | JAPANESE |
| | | ～日本朋友 ‥‥‥ | CHINESE |
| | | 日本の友人が‥‥‥ | JAPANESE |
| | | ⋮ | ⋮ |
| ⋮ | ⋮ | ⋮ | ⋮ |

| JUMP-ENABLED DESTINATION DICTIONARY DB | LANGUAGE INFO |
|---|---|
| LANGUAGE DICTIONARY DB | JPN |
| JPN-ENG. DICTIONARY SUBDB | JPN |
| ENG.-JPN DICTIONARY SUBDB | ENG. |

INFORMATION DISPLAY CONTROL APPARATUS AND RECORDING MEDIUM HAVING RECORDED INFORMATION DISPLAY CONTROL PROGRAM

BACKGROUND OF THE INVENTION

1. Field of the Invention

The present invention relates to information display control apparatus for retrieving information corresponding to a specified headword and recording media having stored a program for retrieving the information.

2. Description of the Related Art

In the past, information display control apparatus called electronic dictionaries are known that include dictionary data on subdictionaries such as a Japanese language dictionary, an English-Japanese dictionary, a Japanese-English dictionary, an English dictionary, and an encyclopedia. By using a jumping function provided in such electronic dictionary and by specifying, for example, as a retrieval word a character string composing a part of an explanatory description appearing in the Japanese language dictionary, an explanatory description of a headline appearing in that Japanese language dictionary or other dictionaries such as the Japanese-English dictionary and the encyclopedia can be displayed.

The jumping function provided in the electronic dictionary refers to one that when an explanatory description for a headword in the dictionary is displayed, specifies and retrieves as a retrieval word a character string composing a part of the explanatory description in the dictionary.

Another known jumping function is to set a desired one of the subdictionaries provided in the electronic dictionary as a jump destination when a jump is made from a different subdictionary now in use to the desired subdictionary.

In this jumping, when a character string of a part of an explanatory description appearing in the subdictionary as the jump source displayed on the display screen is selected, an explanatory description for the selected character string is retrieved, using the character codes that describe the selected character string as those of a headword, from the electronic dictionary data of the jump destination specified for the character codes of the headword, and then displayed.

Thus, when the character codes of the electronic dictionary data of the jump source are different in type from those of the jump destination, appropriate retrieval cannot be expected.

SUMMARY OF THE INVENTION

It is therefore an object of the present invention to realize a jumping function to be fulfilled between the dictionaries described in the character codes of different types to thereby increase the ease of using the jumping function.

In order to achieve the above object, in the inventive information display control apparatus an explanatory description for any headword is displayed that appears in the dictionary data stored in a specified one of a plurality of information storage units whose dictionary data are respectively described in different types of local character codes. When any of the words appearing in the description is specified as a retrieval word, the local character codes of the specified word are converted to the corresponding all-purpose character codes, which are then converted to the corresponding local character codes of a different type used in a different information storage unit. Then the word and its explanatory description of the obtained local character codes are retrieved in the different information storage unit.

Therefore, a headword matching a specified retrieval word in an information storage unit that uses one type of local character codes can be appropriately retrieved in a different storage unit that uses a different type of local character codes to thereby improve the ease of using the jumping function of the electronic dictionary.

In another information display control apparatus according to the present invention, when a headword contained in the explanatory descriptions contained in one of built-in and external information storage units is used as a retrieval word to retrieve a matching headword and its explanatory descriptions in the other of the built-in and external information storage units, the local character codes of the specified retrieval word are converted to the corresponding all-purpose character codes, which are then converted to the corresponding local character codes of the other of the two information storage units. The retrieved word of the obtained local character codes and its explanatory descriptions are retrieved in the other of the two information storage units and displayed.

That is, a headword matching the specified retrieval word in one of the built-in and external dictionaries that use the different types of local character codes can be appropriately retrieved in the other of the two information storage units to thereby improve the ease of using the jumping function of the electronic dictionaries.

In a further information display control apparatus according to the present invention, a first display control unit reads an explanatory description for an input headword from a first information storage unit and displays it. When any part of the explanatory description displayed by the first display control unit is specified as a new headword, this new headword is acquired as a first type of character codes, which are then converted to a second type of character codes, and then an explanatory description for a new headword represented by the second type of character codes is read from a second information storage unit and then displayed.

Therefore, a part of the explanatory description stored in the first type of character codes in the information storage unit is specified as a retrieval word and an explanatory description for a headword matching the retrieval word can be appropriately retrieved from a second information storage unit that uses the second type of character codes to thereby improve the ease of using the jumping function of the electronic dictionaries.

BRIEF DESCRIPTION OF THE DRAWINGS

These and other aspects, features and advantages of the present invention will be clarified by the following detailed description thereof when taken with reference to the accompanying drawings, in which:

FIG. 2 illustrates a functional composition of the electronic dictionary in a first embodiment;

FIG. 3 illustrates one form of data storage in a Japanese language dictionary subDB;

FIG. 4 illustrates one form of data storage in a Chinese-Japanese dictionary subDB;

DETAILED DESCRIPTION OF THE INVENTION

EMBODIMENTS

Referring to FIGS. 1-16, two-embodiments of an information display control apparatus according to the present invention applied to a folding portable electronic dictionary will be described in detail.

First Embodiment

The electronic dictionary 1 includes a built-in electronic dictionary database (DB) including a Japanese language dictionary subDB, an English-Japanese dictionary, a Japanese-English dictionary subDB, a term dictionary subDB, an encyclopedia subDB, etc. Each dictionary subDB has stored headwords, explanatory descriptions explaining the respective headwords, image data, animation data, and voice data in corresponding relationship. A user can select a dictionary type and input a retrieval word to thereby display its explanatory description on the retrieval word. By using the jumping function, the user can also display explanatory descriptions on a word contained in the explanatory descriptions of the retrieval word. As an example, an electronic dictionary that comprises built-in three types of electronic dictionary data of a Japanese language dictionary, an English-Japanese dictionary and a Japanese-English dictionary will be described next.

Figure 1:
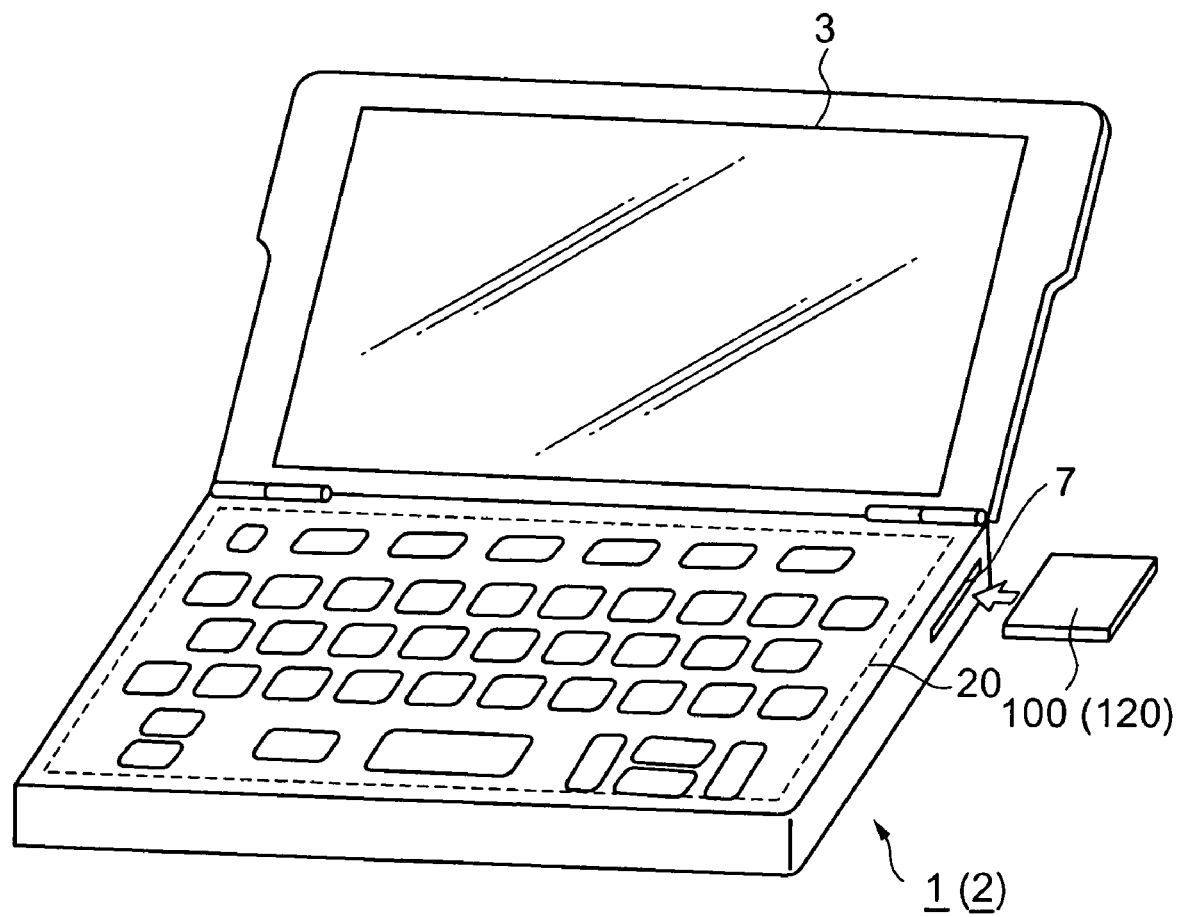
FIG. 1 is a schematic perspective view of an electronic dictionary according to the present invention.

FIG. 1 is a schematic perspective view of the electronic dictionary 1 as one kind of the information display control apparatus. As shown, the electronic dictionary 1 comprises a display screen 3 and a key unit 20. The respective keys of the key unit 20 are allocated their own functions so that a user may manipulate the electronic dictionary 1 by depressing the respective selected keys.

In more detail, the key unit 20 includes kana, Chinese and alphabetic character input keys, an enter key that inputs a command to fix any key operation, cursor keys that input commands to move the cursors, keys that select the respective types of dictionaries, a jump key that inputs a command to jump to a specified word, a key that inputs a command to display examples of using a specified word, etc. By depressing appropriate keys at the input device 20, a retrieval word is input, a dictionary type is selected or retrieval or a jump is commanded.

The electronic dictionary 1 has a card slot 7 on a side of its body into which a memory card 100 on which the dictionary data is stored can be inserted for use.

First, the functional composition of the electronic dictionary 1 will be described. FIG. 2 is a block diagram of the electronic dictionary 1. As shown, the electronic dictionary 1 comprises a CPU 10, the input device 20, a display device 30 with the display screen 3, a recording medium reader 40, a RAM 50, and a ROM 70.

CPU 10 executes various processes based on predetermined programs in accordance with input commands, transfers commands/data to the respective functional units concerned, and controls the electronic dictionary 1 systematically. More specifically, CPU 10 reads out a program stored in ROM 70 in accordance with a read command inputted at the input device 20, and executes a required process based on the program. CPU 10 then stores a result of the processing in RAM 50, outputs to the display device 30 a display signal to display the result of the processing as required to thereby display the corresponding information.

The input device 20 comprises a plurality of keys necessary for inputting Japanese kana letters, Chinese characters, alphabetical letters, and for selecting a desired one of various functions, and outputs a key depressed signal to CPU 10. By manipulating the input device 20, a word to be retrieved is inputted, a desired one of the dictionaries is selected, and various retrieval and jumps are commanded.

The display device 30 displays various pictures based on display signals from CPU 10 and includes an LCD.

The recording medium reader 40 receives an external recording medium 100 removably and reads data stored on the recording medium 100 in accordance with a read command from CPU 10. The card slot 7 of FIG. 1 is formed in the recording medium reader 40.

The external recording medium 100 has stored an external Chinese-Japanese dictionary DB 102, which comprises a Chinese-Japanese dictionary subDB 102a, an all-purpose character code/Chinese-Japanese dictionary local character code (Japanese) conversion table 102b, and an all-purpose character code/Chinese-Japanese dictionary local character code (Chinese) conversion table 102b.

ROM 70 has stored an initial program (not shown) for performing various initializing processes, inspection of the hardware or loading required programs. That is, when the power source of the electronic dictionary 1 is turned on, CPU 10 executes the initial program to set the operational environment of the electronic dictionary 1.

ROM 70 has also stored other programs (not shown) for operation of the electronic dictionary 1, and programs and data for realizing the various functions of the electronic dictionary 1. Especially, it has stored a built-in dictionary DB 71, an index table 73, and a dictionary retrieval program 75. As mentioned above, the built-in dictionary DB 71 comprises Japanese language dictionary subDB 71a, English-Japanese dictionary subDB 71b, Japanese-English dictionary subDB 71c, all-purpose character code/existing local character code (Japanese) conversion table 71d, and all-purpose character code/existing local character code (English) conversion table 71e. The dictionary retrieval program 75 comprises an external dictionary jumping program 75a.

RAM 50 has memory areas that temporarily store various programs to be executed by CPU 10 and data occurring/required on execution of these programs. Especially, RAM 50 has stored a jump-source local character code storage area 53, a language information storage area 51, an all-purpose character code storage area 55, and a jump-destination local character code storage area 57.

CPU 10 reads the dictionary retrieval program 75 stored in ROM 70 in accordance with an inputted retrieval command and executes a dictionary retrieving process. For example, when a dictionary subDB included in the built-in dictionary DB 71 is specified, CPU 10 retrieves a headword matching a specified retrieval word from among the headword data stored in the dictionary subDB and displays the headword and its corresponding explanatory descriptions on the display 30. The Japanese language dictionary subDB 71a, English-Japanese dictionary subDB 71b, and Japanese-English dictionary subDB 71c of the built-in dictionary DB 71 are described in local character codes of the same type.

FIG. 3 illustrates a data storage form of the Japanese language dictionary subDB 71a. As shown, the Japanese language dictionary subDB 71a has stored headword data and the corresponding explanatory description data in which the headwords and their explanatory descriptions in corresponding relationship. Each headword and its explanatory description have the corresponding language information. The language information is used to specify in which country the language involving the character strings contained in the dictionary subDB is used. Each of the explanatory descriptions stored in the Japanese language dictionary subDB 71a has language information "Japanese".

Although not shown, each of the English-Japanese dictionary subDB 71b and the Japanese-English dictionary subDB 71c has stored headwords, their explanatory descriptions and language information in corresponding relationship in a form similar to the data storage form of the Japanese language dictionary subDB 71a.

When a Chinese-Japanese dictionary is specified and a command to retrieval a word is inputted, CPU 10 reads a headword matching the retrieval word and its explanatory description from the Chinese-Japanese dictionary subDB 102a provided in the external Chinese-Japanese dictionary DB102 and displays them on the display device 30. The Chinese-Japanese dictionary subDB 102a is described in the local character codes for the Chinese-Japanese dictionary subDB 102a.

FIG. 4 illustrates a data storage form of the Chinese-Japanese dictionary subDB 102a. As shown, the Chinese-Japanese dictionary subDB 102a has stored headword data and their explanatory description data in corresponding relationship. The headwords are placed in corresponding relationship to their items of language information "Chinese". The explanatory description is separated into a plurality of explanatory descriptions each with an item of language information on the character strings contained in the explanatory descriptions.

The first embodiment illustrates that a word contained in explanatory description read from the Chinese-Japanese dictionary subDB 102a of the external Chinese-Japanese dictionary DB 102 and displayed on the display device is specified as a jump destination and that a jump is then made to the built-in dictionary DB 71. A word specified as the jump destination is hereinafter referred to as "jump word".

More specifically, when a jump word is specified in an explanatory description read from the Chinese-Japanese dictionary DB 102a and displayed on the display device and then a jump command is inputted, CPU 10 reads the external dictionary jump program 75a and then executes an external dictionary jumping process.

Figure 5:
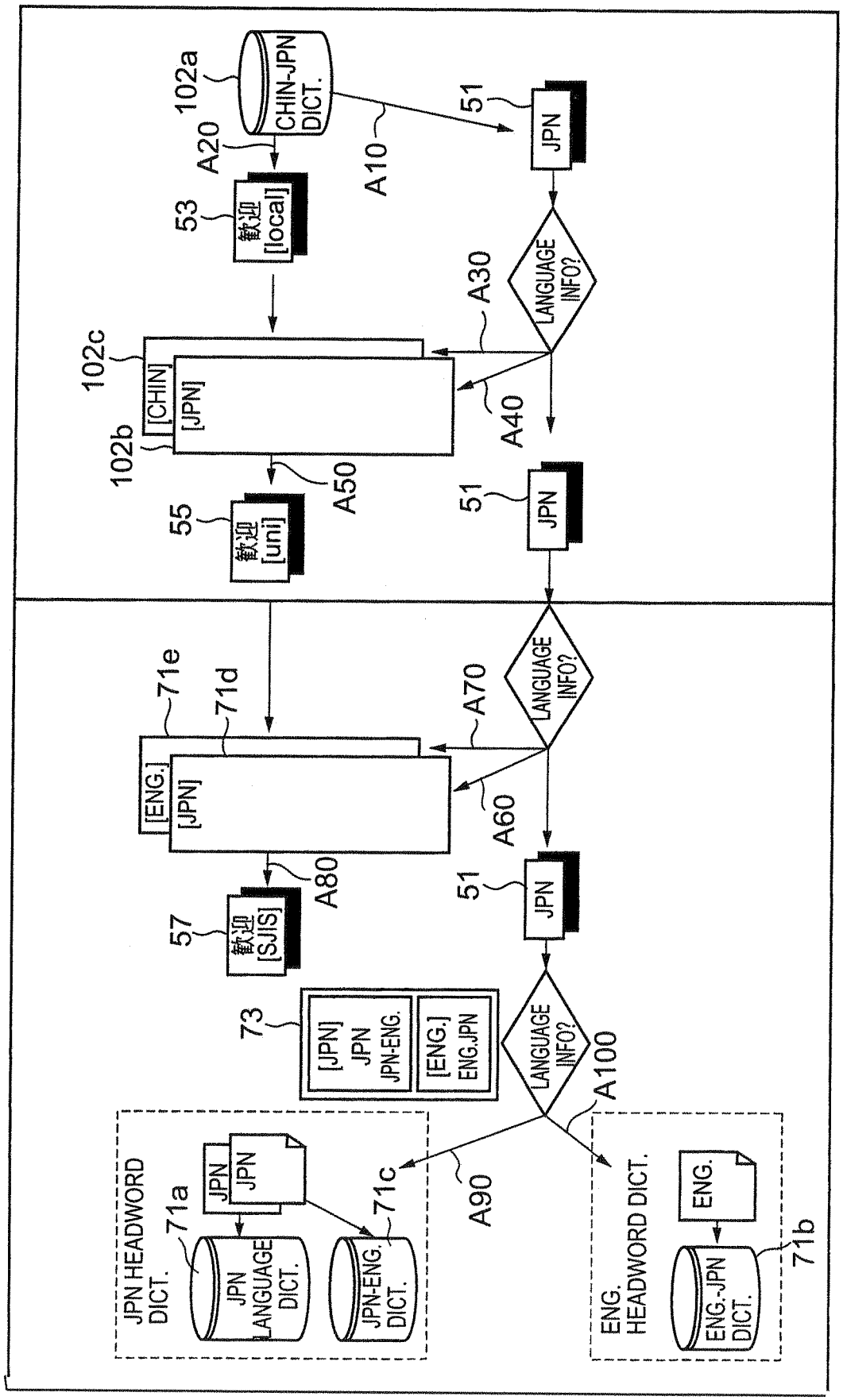
FIG. 5 illustrates an external dictionary jumping process to be performed in the first embodiment.

FIG. 5 illustrates the external dictionary jumping process to be performed in the first embodiment. More particularly, FIG. 5 illustrates the case in which a word 歓迎(meaning "Welcome") placed in corresponding relationship to language information "Japanese" in the dictionary data (more particularly, an explanatory description) read from the Chinese-Japanese dictionary DB 102a and displayed on the display device is specified as a jump word.

First, CPU 10 acquires the language information "Japanese" for the jump word 歓迎and updates the language information storage location 51 with this language information (A10). Also, in this case a jump-source local character code storage location 53 is updated with the specified jump word 歓迎(A20). Then, CPU 10 determines the acquired language information, refers to the corresponding all-purpose character code/Chinese-Japanese dictionary local character code conversion table, and then converts the local character codes of the jump word to the corresponding all-purpose character codes.

More specifically, when a word to which the language information "Chinese" is placed in corresponding relationship is specified as the jump word, CPU 10 refers to the all-purpose character code/Chinese-Japanese dictionary local character code (Chinese) conversion table 102c (A30). When a word to which the language information "Japanese" is placed in corresponding relationship is specified as the jump word, CPU 10 refers to the all-purpose character code/Chinese-Japanese dictionary local character code (Japanese) conversion table 102b (A40). Then, CPU 10 converts the local character codes of the jump word to the corresponding all-purpose character codes and updates the all-purpose character code storage area 55 with the obtained all-purpose character codes (A50). FIG. 5 illustrates that the jump word 歓迎described in the Chinese-Japanese dictionary local character codes is converted to the corresponding all-purpose character codes based on the all-purpose character code/Chinese-Japanese dictionary local character code (Japanese) conversion table 102b.

Relevant all-purpose character codes are stored in corresponding relationship to the Chinese-Japanese dictionary local character codes that describe Japanese character strings or explanatory descriptions contained in the Chinese-Japanese dictionary subDB 102a in the all-purpose character code/Chinese-Japanese dictionary local character code (Japanese) conversion table 102b. Similarly, relevant all-purpose character code are stored in corresponding relationship to the Chinese-Japanese dictionary local character codes that describe Chinese character strings or explanatory descriptions contained in the Chinese-Japanese dictionary subDB 102a in the all-purpose character code/Chinese-Japanese dictionary local character code (Chinese) conversion table 102c. For example, "Unicodes" normalized to express in unified character codes the characters used in the respective countries in the world are used as the all-purpose character codes.

Subsequently, CPU 10 determines the language information, refers to the corresponding all-purpose character code/existing local code conversion table and converts the all-purpose character codes to which the jump word is converted to the corresponding existing local character codes.

More specifically, CPU 10 refers to the all-purpose character code/existing local character code (Japanese) conversion table 71d when the language information on the jump word is "Japanese" (A60). CPU 10 also refers to the all-purpose character code/existing local character code (English) conversion table 71e when the language information on the jump word is "English" (A70). Then, CPU 10 converts the all-purpose character codes of the jump word to the corresponding existing local character codes and updates the jump-destination local character code storage location 57 with the obtained existing local character codes (A80). FIG. 5 illustrates that a jump word 歓迎 described in the all-purpose character codes is converted to the corresponding existing local character codes based on the all-purpose character code/existing local character code (Japanese) conversion table 71d.

The all-purpose character code/existing local character code (Japanese) conversion table 71d has stored existing local character codes that describe Japanese character strings and relevant all-purpose character codes in corresponding relationship. The all-purpose character code/existing local character code (English) conversion table 71e has stored existing local character codes that describe English character strings and relevant all-purpose character codes in corresponding relationship.

When an item of language information excluding "Japanese" or "English" has been specified, CPU 10 cannot convert the all-purpose character codes to which the jump word is converted to the corresponding existing local character codes. Therefore, CPU 10 determines that a jump cannot be made to the dictionary subDB of interest included in the built-in dictionary DB 71 and terminates the process.

Then, CPU 10 determines the language information, extracts a jump-enabled destination dictionary from the index table 73 and receives a selection of a dictionary subDB as the jump destination.

Figure 6:
FIG. 6 illustrates an index table used in the first embodiment.

FIG. 6 shows one example of the index table 73, which includes items of language information and the corresponding dictionary subDBs to which each of a jump can be made when a respective one of the items of language information is specified. More particularly, that of the dictionary subDBs of the built-in dictionary DB that has a headword coinciding in language information with the specified headword is stored as a jump-enabled destination dictionary subDB. When the language information is "Japanese" (A90), CPU 10 extracts Japanese language dictionary subDB 71a and a Japanese-English dictionary subDB 71c as the jump-enabled destination dictionary subDBs whereas when the language information is "English" (A100), CPU 10 selects the English-Japanese dictionary subDB 71b as the jump-enabled destination dictionary DB.

In response to selection of the jump-enabled destination dictionary subDB, CPU 10 retrieves in the jump destination dictionary subDB a headword that matches a jump word whose local character codes are converted to the corresponding existing local character codes that are stored at a local character code storage location 57 of the jump destination, and displays the corresponding explanatory descriptions for the headword on the display device 30.

Figure 7:
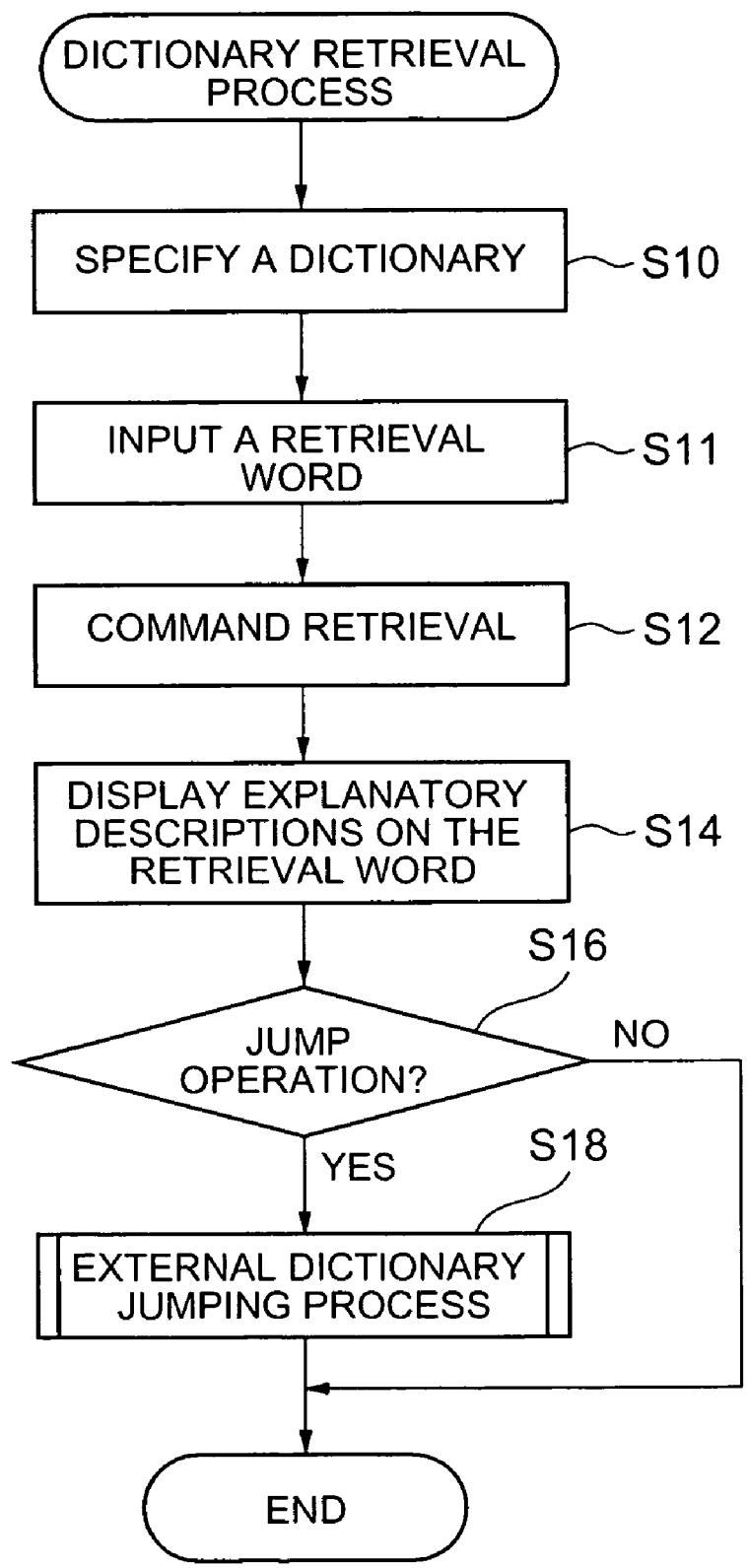
FIG. 7 illustrates a flow of a dictionary retrieval process of an electronic dictionary in the first embodiment.

Operation of the electronic dictionary 1 in the first embodiment will be described next with reference to FIGS. 7-9. FIGS. 7 and 9 illustrate a flow of operation of the electronic dictionary 1. FIG. 8 illustrates a transition of pictures displayed on the display device 30.

FIG. 7 is a flowchart of a dictionary retrieval process to be performed by the electronic dictionary 1 based on the dictionary retrieval program 85. CPU 10 displays a retrieval word input picture on the display 30. A user specifies a desired dictionary subDB (step S10), inputs a retrieval word (step S11), and commands its retrieval (step S12).

In response to this retrieval command, CPU 10 sets a specified retrieval word as a headword, retrieves the headword in the headword data stored in the dictionary subDB specified at step S10, reads the corresponding explanatory descriptions and displays them along with the headword on the display device 30 (step S14).

Figure 8A:
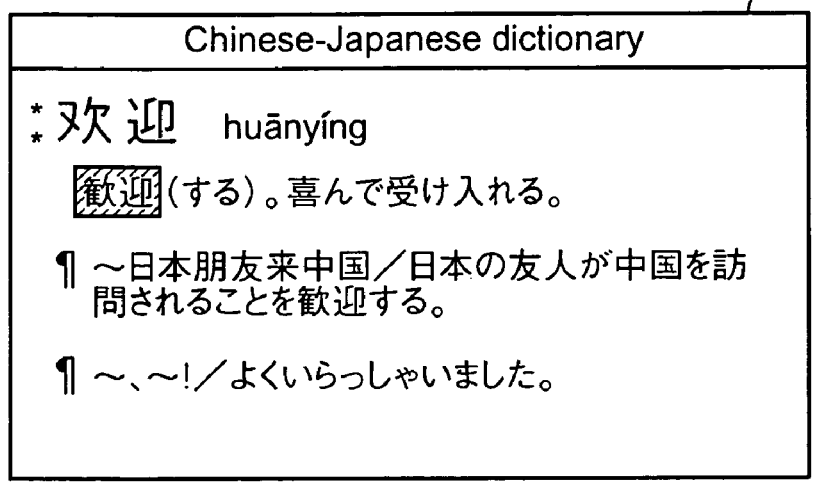
FIGS. 8A, 8B and 8C cooperatively illustrate a transition of pictures in the first embodiment.
Figure 9:
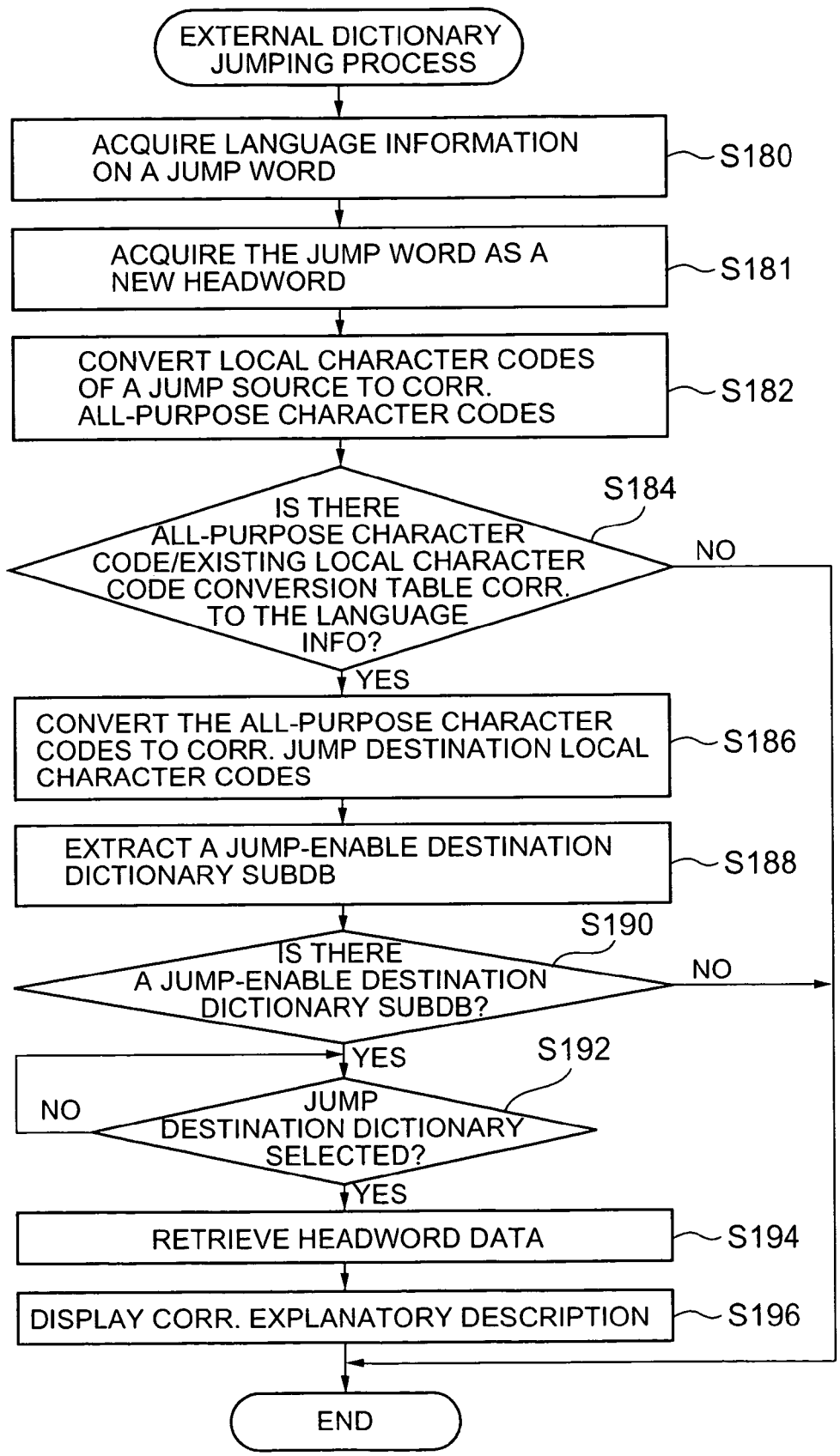
FIG. 9 illustrates a flow of an external dictionary jumping process of the electronic dictionary in the first embodiment.

FIG. 8A illustrates a retrieval result display picture W10 displayed on the display device 30 at this stage, or when the Chinese-Japanese dictionary is specified. As shown, a headword (emphsized) matching the word specified as the retrieval one, and its corresponding explanatory descriptions are displayed.

When a jump is commanded (step S16), CPU 10 executes the external dictionary jumping process (step S18). More specifically, CPU 10 performs the following processes when a word contained in the explanatory descriptions stored in the Chinese-Japanese dictionary subDB 102a of the external Chinese-Japanese dictionary DB 102 displayed on the display device is specified as a jump word, and a jump operation is then performed.

FIG. 9 is a flowchart of the external dictionary jumping process to be performed by the electronic dictionary 1 based on the external dictionary jumping program 75a. As shown, first, CPU 10 reads language information on the specified jump word, updates the language information storage location 51 with the read language information (step S180), acquires the specified jump word as a new headword, and stores this headword at the jump-source local character code storage location 53 (step S181).

Subsequently, CPU 10 converts the character codes of the jump word stored in the jump-source local character code storage location 53 to the corresponding all-purpose character codes by referring to the all-purpose character code/Chinese-Japanese dictionary local character code conversion table for the language information, and updates the all-purpose character code storage location 55 (step S182).

Further, CPU 10 finds an all-purpose character code/existing local character code conversion table for the language information on the jump word (step S184, YES), converts the all-purpose character codes stored in the all-purpose character code storage location 55 to the corresponding existing local character codes by using the found conversion table, and updates the jump-destination local character code storage location 57 with the corresponding existing local character codes (step S186). When there is no all-purpose character code/existing local character code conversion table for the language information (step S184, NO), CPU 10 terminates this process.

Subsequently, CPU 10 extracts from the index table 73 dictionary subDBs to which a jump can be made based on the language information on the jump word (step S188). When the dictionary subDBs are extracted (step S190, YES), CPU 10 prompts the user to select a jump destination dictionary subDB.

Figure 8B:
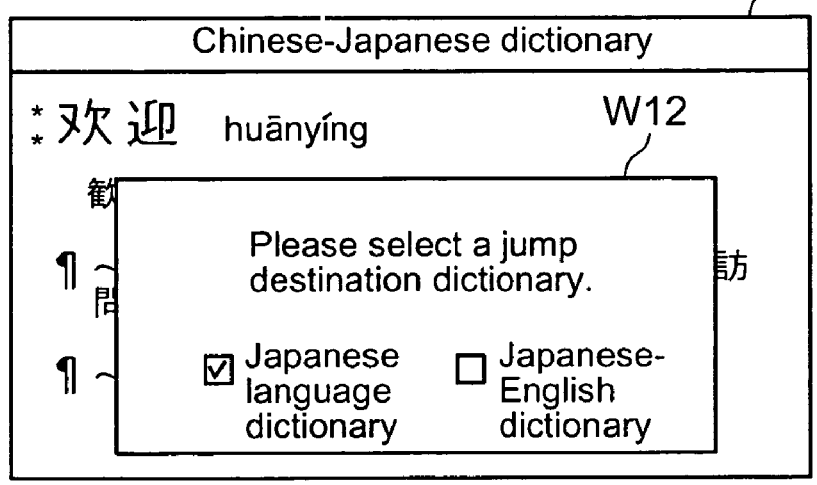

FIG. 8B illustrates a jump destination dictionary select picture W12 displayed on the display device 30 at this stage. For example, when a word 歓迎 is selected and a jump command is inputted on a retrieval result display picture W10 of FIG. 8A (the emphasized display in FIG. 8A), a jump-destination dictionary select picture W12 is displayed on the retrieval result display picture W10, so that the respective types of the jump-enabled destination dictionary subDBs "Japanese language dictionary" and "Japanese-English dictionary" extracted based on the language information "Japanese" on the jump word 歓迎 are displayed selectably on the picture W10.

When one jump-enabled destination dictionary subDB is selected (step S192, YES), CPU 10 retrieves a headword matching the jump word from among the headword data stored in the selected jump-destination dictionary subDB (step S194), displays the headword and its corresponding explanatory descriptions on the display device 30 (step S196), and then terminates this process.

Figure 8C:
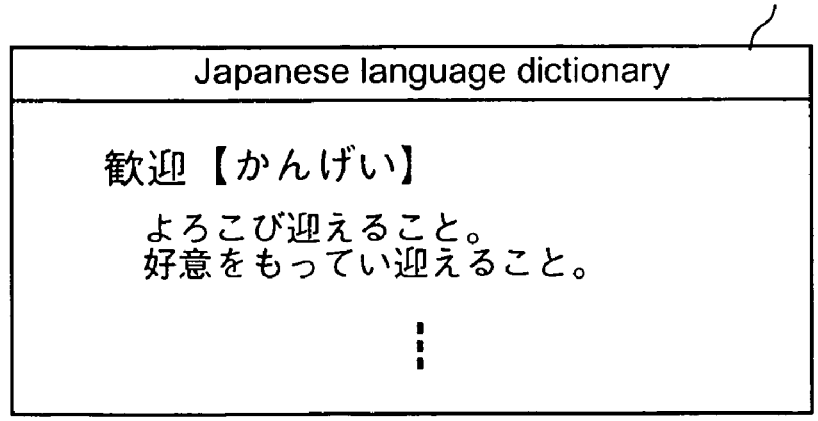

When, for example, a dictionary type "language dictionary" is selected on the jump-destination dictionary select picture W12 of FIG. 8B, a jump is made from "Chinese-Japanese dictionary" to "Japanese language dictionary" and a retrieval result display picture W14 on which the jump word 歓迎and the corresponding explanatory descriptions read from the language dictionary subDB 71a are displayed is presented as shown in FIG. 8C.

As described above, according to the first embodiment the built-in dictionary DB 71 of the electronic dictionary comprises the all-purpose character code/existing local character code conversion table on which the existing local character codes and their all-purpose character codes are placed in corresponding relationship for the respective languages that describe the words contained in the headword data and the corresponding explanatory descriptions stored in the respective dictionary subDBs of the built-in dictionary DB 71. The external Chinese-Japanese dictionary DB 102 comprises the all-purpose character code/Chinese-Japanese dictionary local character code conversion table on which Chinese-Japanese dictionary local character codes and all-purpose character codes are placed in corresponding relationship for the respective languages that describe the words contained in the headword data and their explanatory description stored in the Chinese-Japanese dictionary subDB 102a.

Thus, when a word contained in the explanatory descriptions stored, for example, in the Chinese-Japanese dictionary subDB 102a is specified as a jump word, the Chinese-Japanese dictionary local character codes of the jump word is temporarily converted to the corresponding all-purpose character codes in accordance with the jumping operation, and then the all-purpose character codes of the jump word are converted to the corresponding existing local character codes by referring to the all-purpose character code/existing local character code conversion table for the language information on the jump word. That is, the Chinese-Japanese dictionary local character codes of the jump word can be converted appropriately to the corresponding existing local character codes. Therefore, a jump can be made between the external Chinese-Japanese dictionary DB 102 and one of the dictionary subDBs of the built-in dictionary DB 71 which are described in different local character codes. After the conversion, the retrieval process can be performed Further, the jump-enabled destination dictionary DBs of the built-in dictionary DB 71 can be detected automatically based on the language information on the jump word. Therefore, the ease of using the jumping function of the electronic dictionary 1 is improved.

While in the first embodiment it is illustrated that the process is terminated as unretrievable when there is no all-purpose character code/existing local character code conversion table for the language information on the specified jump word at step S184 of FIG. 9, the all-purpose character codes of the jump word may be converted to the corresponding existing local character codes, using the all-purpose character code/existing local character code conversion table included in the built-in dictionary DB 71 by neglecting the language information on the jump word, and then the font of the jump word indicative of the existing local character codes may be reported to the user before the retrieving process to thereby confirm whether or not the retrieving process should continue. For example, when a word of Chinese characters to which the language information "Chinese" is placed in corresponding relationship is specified as a jump word, CPU 10 converts the jump word to the corresponding word of Japanese Kanji characters by referring to the all-purpose character code/existing local character code (Japanese) conversion table 71d and reports to the user that the font has been changed.

Figure 10:
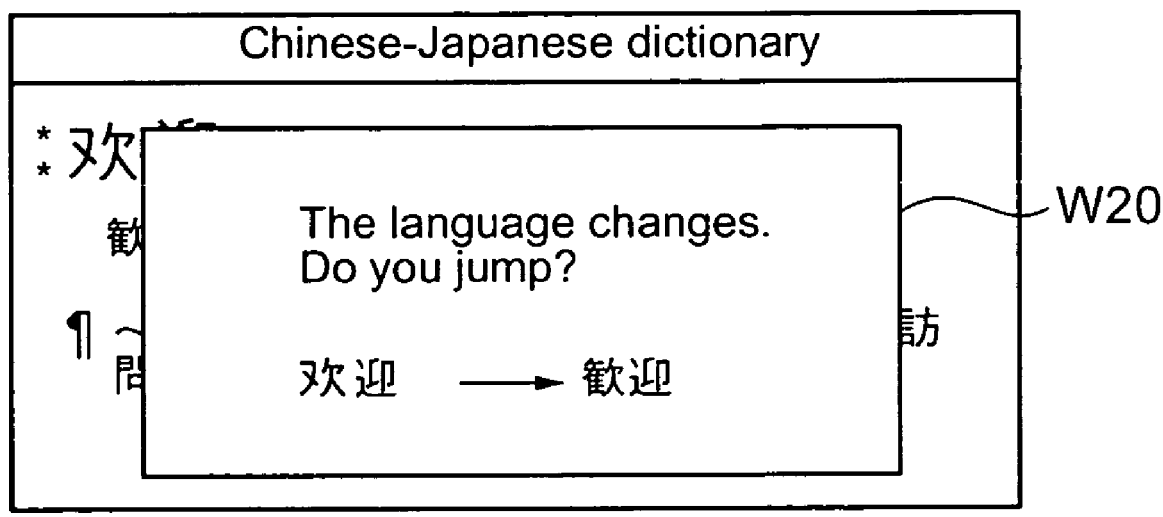
FIG. 10 illustrates a display picture in a modification of the first embodiment.

FIG. 10 illustrates a picture displayed on the display device at this time. As shown, a confirmative picture W20 is displayed on the display screen on which picture a message requesting to confirm whether or not the retrieving process should continue is displayed. Further, the jump-source local character codes (Chinese-Japanese dictionary local character codes) 10a of the specified jump word and the corresponding jump destination local character codes (existing local character codes) 10b are displayed.

Second Embodiment

Figure 11:
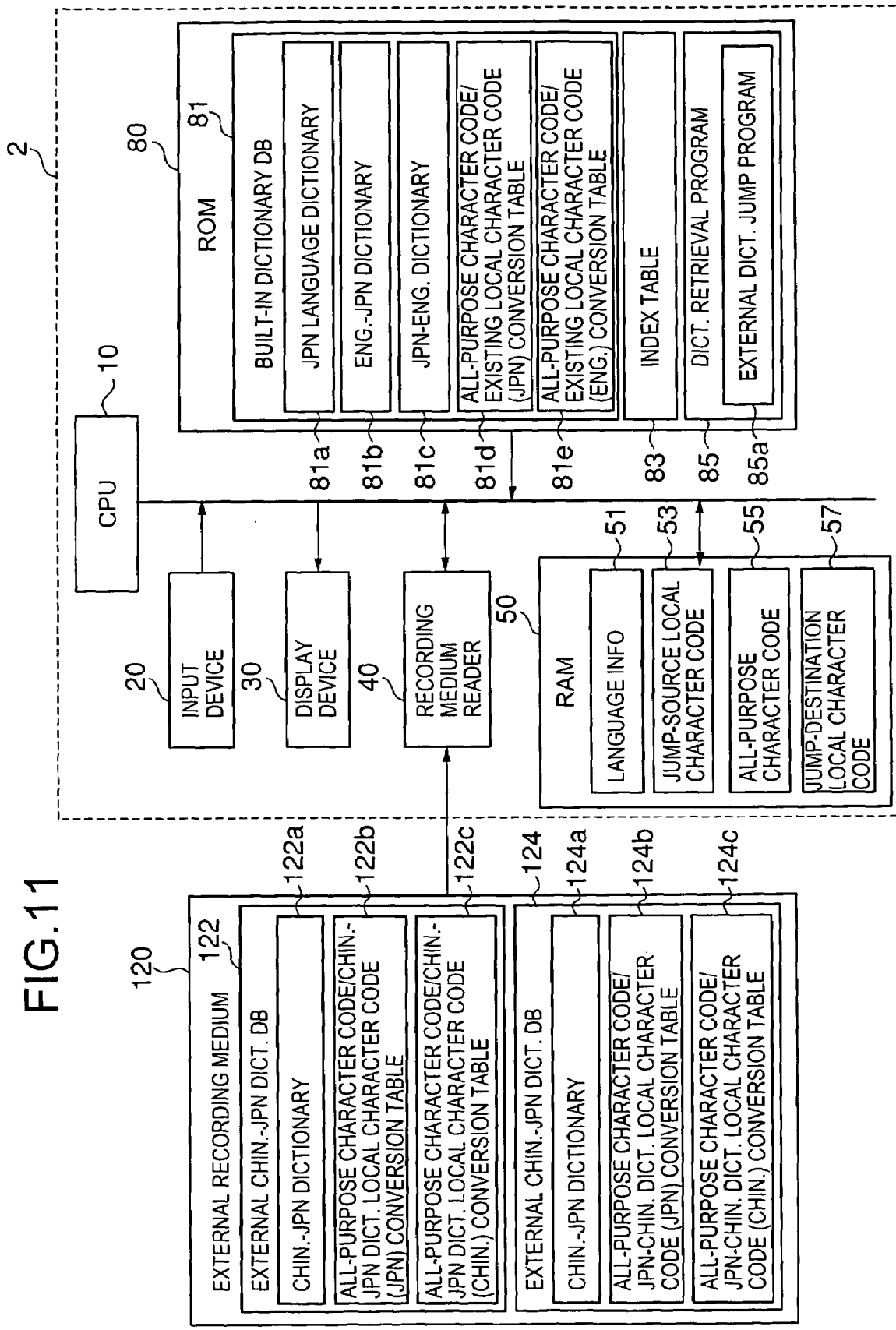
FIG. 11 illustrates a functional composition of an electronic dictionary in a second embodiment.

A second embodiment of the electronic dictionary 2 according to the present invention will be described next. This dictionary has the same appearance as in FIG. 1. FIG. 11 illustrates a functional block diagram of the electronic dictionary 2. As shown, the electronic dictionary 2 comprises CPU 10, input device 20, display device 30, recording medium reader 40, RAM 50, and ROM 80. The second embodiment illustrates that a jump is made to the external Chinese-Japanese dictionary DB 122 or the external Japanese-Chinese dictionary DB 124 in accordance with a jumping operation in which a word contained in the explanatory descriptions read from one of the dictionary subDBs of the built-in dictionary DB 81 and displayed on the display device is specified as a jump word. The same reference numeral is used to denote the same functional block of the electronic dictionaries 1 and 2 of the first and second embodiments of FIGS. 2 and 11, and their further descriptions will be omitted.

As shown in FIG. 11, ROM 80 especially comprises an built-in dictionary DB 81, an index table 83 and a dictionary retrieval program 85. The built-in dictionary DB 81 comprises a Japanese language dictionary subDB 81a, an English-Japanese dictionary subDB 81b, a Japanese-English dictionary subDB 81c, an all-purpose character code/existing local character code (Japanese) conversion table 81d and an all-purpose character code/existing local character code (English) conversion table 81e. The dictionary retrieval program 85 comprises a built-in dictionary jump program 85a.

The external recording medium 120 has stored an external Chinese-Japanese dictionary DB 122, and an external Japanese-Chinese dictionary DB 124. The external Chinese-Japanese dictionary DB 122 comprises a Chinese-Japanese dictionary subDB 122a, an all-purpose character code/Chinese-Japanese dictionary local character code (Japanese) conversion table 122b, and an all-purpose character code/Chinese-Japanese dictionary local character code (Chinese) conversion table 122c. The external Japanese-Chinese dictionary DB 124 comprises a Japanese-Chinese dictionary subDB 124a, an all-purpose character code/Japanese-Chinese dictionary local character code (Japanese) conversion table 124b, and an all-purpose character code/Japanese-Chinese dictionary local character code (Chinese) conversion table 124c.

CPU 10 reads the dictionary retrieval program 85 stored in ROM 80 in response to the inputted retrieval command and executes the dictionary retrieval process. More specifically, CPU 10 retrieves a headword matching the specified retrieval word from the headword data stored in a specified dictionary subDB in accordance with the inputted retrieval command, and displays the headword and its corresponding explanatory descriptions on the display device 30.

Each of the Japanese language dictionary subDB 81*a*, English-Japanese dictionary subDB 81*b*, and Japanese-English dictionary subDB 81*c* of the built-in dictionary DB 81; the Chinese-Japanese dictionary subDB 122*a* of the external Chinese-Japanese dictionary DB122; and the Japanese-Chinese dictionary subDB 124*a* of the external Japanese-Chinese dictionary DB 124 has stored headword data and their explanatory descriptions in corresponding relationship as in the language dictionary subDB 71*a* and the Japanese-Chinese dictionary subDB 124*a* shown by FIGS. 3 and 4, respectively, in the first embodiment. As in the first embodiment, the dictionary subDBs of the built-in dictionary DB 81 are described the existing local character codes whereas the Chinese-Japanese dictionary subDB 122*a* of the external Chinese-Japanese dictionary DB 122 is described in the Chinese-Japanese dictionary local character codes. The Japanese-Chinese dictionary subDB 124*a* of the external Japanese-Chinese dictionary DB 124 is described in the local character codes for the Japanese-Chinese dictionary subDB 124*a*.

When a jump word is specified in the explanatory descriptions of the dictionary data read from a dictionary subDB of the built-in dictionary DB 81 and displayed on the display device, and then a jump command is inputted, CPU 10 reads the built-in dictionary jump program 85*a* and executes the built-in dictionary jumping process.

Figure 12:
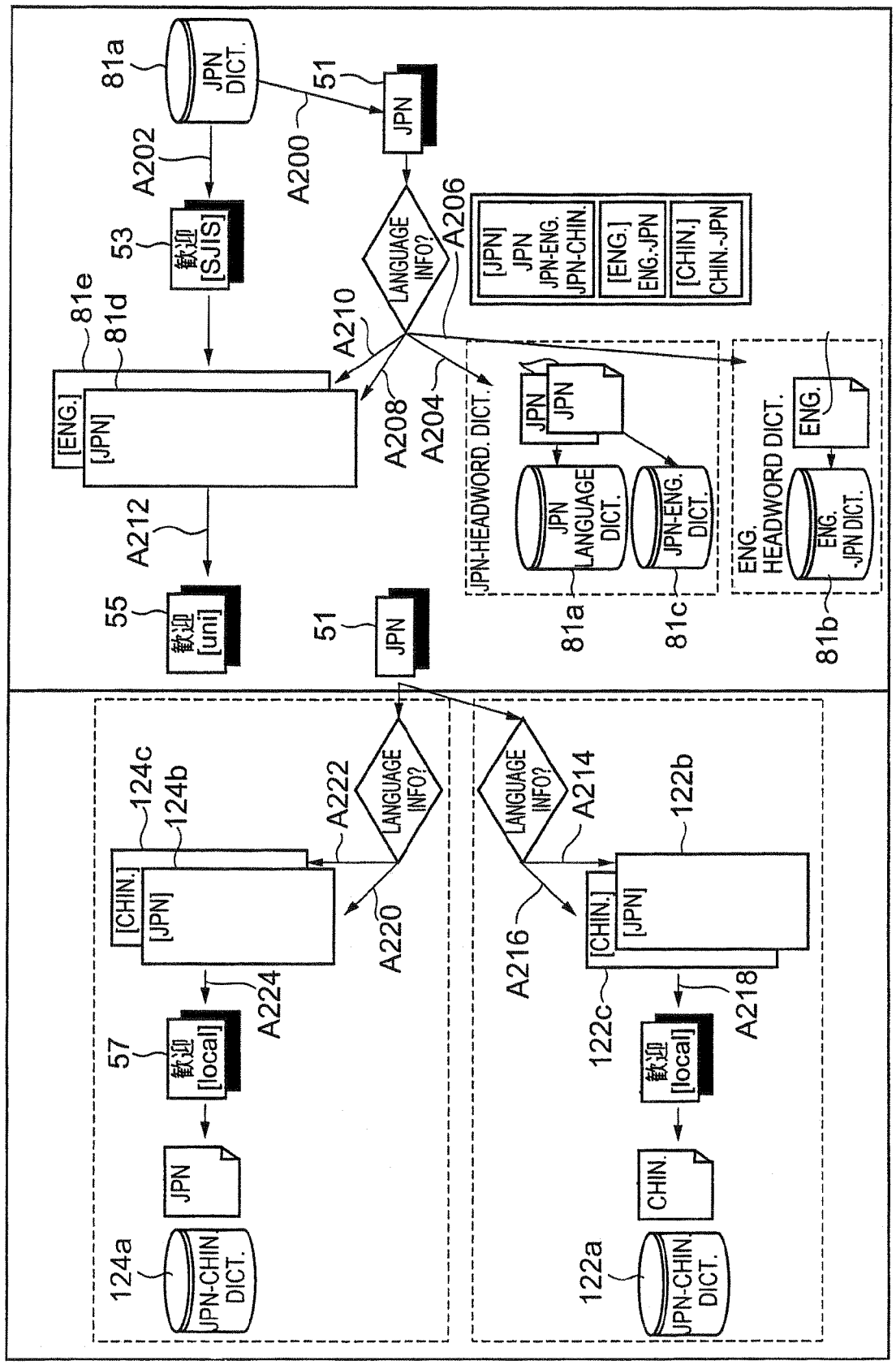
FIG. 12 illustrates a built-in dictionary jumping process to be performed in the second embodiment.

FIG. 12 illustrates the built-in dictionary jumping process in the second embodiment. It also illustrates the case in which a word 歓迎to which the language information "Japanese" is placed in corresponding relationship in the dictionary data read from the Japanese language dictionary subDB 81*a* and displayed on the display device is specified as a jump word.

CPU 10 first acquires language information "Japanese" on the jump word 歓迎and updates the language information storage location 51 with the language information "Japanese" (A200). Also, at this time the jump-source local character code storage location 53 is updated with the specified jump word 歓迎(A202).

CPU 10 detects a dictionary DB stored in the external recording medium 120. When CPU 10 detects this external dictionary DB, it acquires language information on the headwords stored in the dictionary subDBs of the external dictionary DB and updates the index table 83 with the language information, as described below in more detail.

Figure 13:
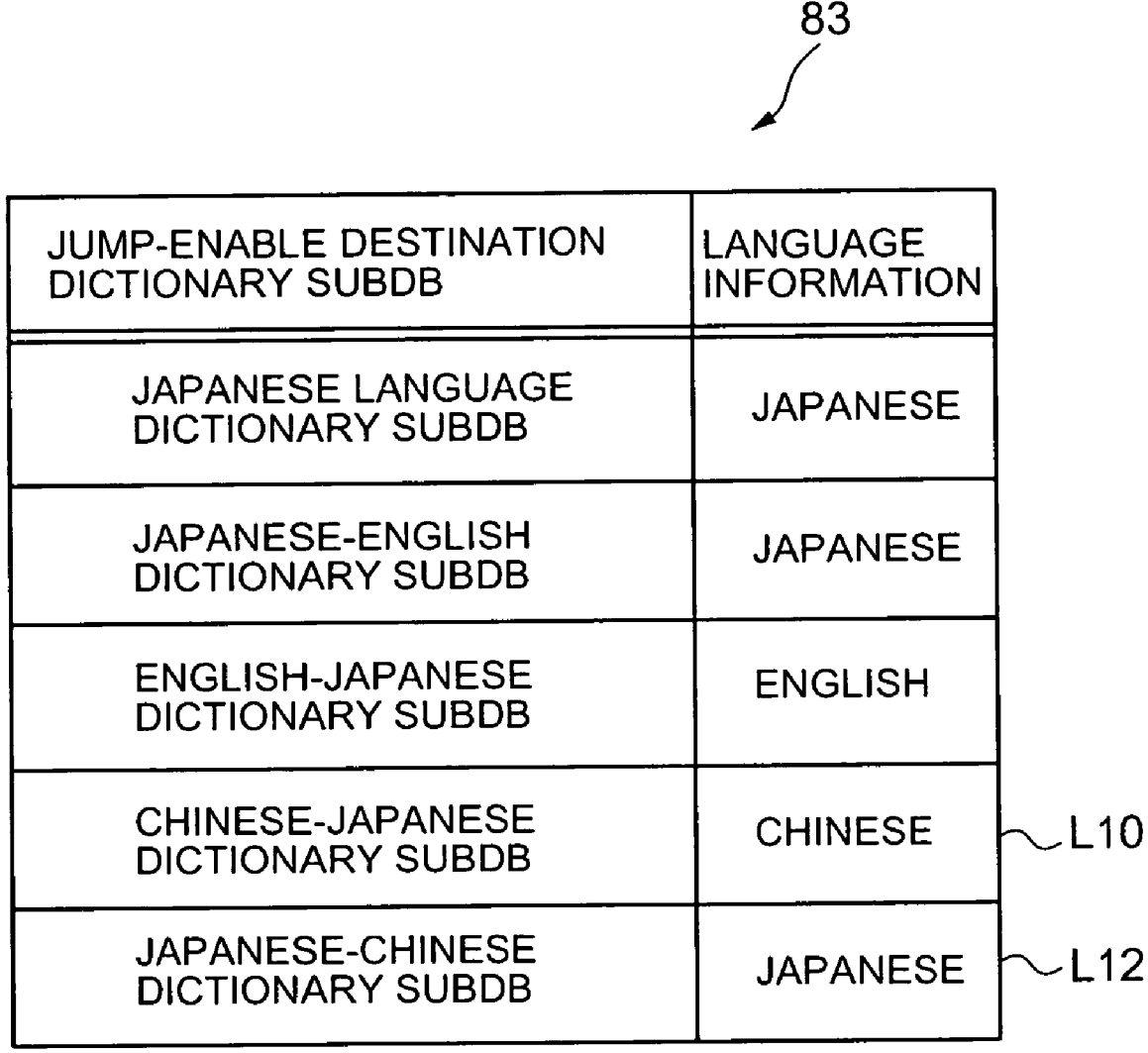
FIG. 13 illustrates an index table in the second embodiment.

FIG. 13 illustrates the index table 83 on which a plurality of dictionary subDBs and a plurality of items of language information are stored in corresponding relationship such that when an item of language information is specified, a jump can be made to the corresponding dictionary subDB. When CPU 10 detects the external dictionary DB, it adds to the index table 83 a record that places in corresponding relationship the dictionary subDBs of the detected external dictionary DB and the items of language information on the headwords stored in the dictionary subDBs.

More particularly, when the external recording medium 120 of FIG. 11 is set, CPU 10 detects the external Chinese-Japanese dictionary DB 122 and the external Japanese-Chinese dictionary DB 124 in the medium, and adds to the index table 83 a record L10 that places in corresponding relationship a jump-enabled destination "Chinese-Japanese dictionary subDB" as the Chinese-Japanese dictionary subDB 122*a* of the external Chinese-Japanese dictionary DB 122 and the language information "Chinese" on the headwords stored in the Chinese-Japanese dictionary subDB 122*a* and a record L12 that places in corresponding relationship a jump-enabled destination "Japanese-Chinese dictionary subDB" as the Japanese-Chinese dictionary subDB 124*a* of the external Japanese-Chinese dictionary DB 124 and the language information "Japanese" on the headwords stored in the Japanese-Chinese dictionary subDB 124*a*.

CPU 10 determines the language information and extracts the jump-enabled destination dictionary subDB in the index table 83. More particularly, when the language information is "Japanese", CPU 10 extracts in the index table the Japanese language dictionary DB 81*a*, Japanese-English dictionary subDB 81*c* and Japanese-Chinese dictionary subDB 124*a* as the jump-enabled destinations. When the language information is "English", CPU 10 extracts the English dictionary DB 81*b* whereas when the language information is "Chinese", CPU 10 extracts the Chinese-Japanese dictionary subDB 122*a*. Then, CPU 10 receives a selection of a dictionary subDB as a jump destination.

When the dictionary subDB selected as the jump destination is included in the built-in dictionary DB 81 (A204, 206), CPU 10 retrieves a headword matching the jump word from the dictionary subDB and displays the headword and the corresponding explanatory descriptions on the display device 30.

When a dictionary subDB selected as the jump destination is one of the dictionary subDBs of the external dictionary DB, CPU 10 refers to the all-purpose character code/existing local character code conversion table for the language information on the jump word to thereby convert the jump word to the corresponding all-purpose character codes.

More specifically, when a word to which the language information "Japanese" is placed in corresponding relationship is specified as the jump word, CPU 10 refers to the all-purpose character code/existing local character code (Japanese) conversion table 81*d* (A208). When the word to which the language information "English" is placed in corresponding relationship is specified as the jump word, CPU 10 refers to the all-purpose character code/existing local character code (English) conversion table 81*e* (A210). CPU 10 then converts the local character codes of the jump word to the corresponding all-purpose character codes and updates the all-purpose character code storage location 55 with the obtained all-purpose character codes (A212). In the example of FIG. 12, the jump word 歓迎described in the existing local character codes is converted to the corresponding all-purpose character codes based on the all-purpose character code/existing local character code (Japanese) conversion table 81*d*.

When, for example, the Chinese-Japanese dictionary subDB 122*a* is selected as the jump destination, CPU 10 refers to the all-purpose character code/Chinese-Japanese dictionary local character code conversion table for the language information on the jump word and then converts the all-purpose character codes to which the jump word is converted to the corresponding Chinese-Japanese dictionary local character codes.

More specifically, when the language information on the jump word is "Japanese", CPU 10 refers to the all-purpose character code/Chinese-Japanese dictionary local character code (Japanese) conversion table 122*b* (A214). When the language information is "Chinese", CPU 10 refers to the all-purpose character code/Chinese-Japanese dictionary local character code (Chinese) conversion table 122*c* (A216). CPU 10 then converts the all-purpose character codes of the jump word to the corresponding Chinese-Japanese dictionary local character codes and updates the jump-destination local character code storage location 57 with the obtained local character codes (A218).

Then, CPU 10 retrieves a headword matching the jump word described in the Chinese-Japanese dictionary local character codes stored in the jump-destination local character code storage location 57 in the Chinese-Japanese dictionary subDB 122*a* and displays the headword and its corresponding explanatory descriptions on the display device 30.

When the Japanese-Chinese dictionary subDB 124*a* is selected as a jump destination, CPU 10 refers to the all-purpose character code/Japanese-Chinese dictionary local character code conversion table for the language information on the jump word and converts the all-purpose character codes to which the jump word is converted to the corresponding Japanese-Chinese dictionary local character codes.

More specifically, when the language information is "Japanese", CPU 10 refers to the all-purpose character code/Japanese-Chinese dictionary local character code (Japanese) conversion table 124*b* (A220). when the language information is "Chinese", CPU 10 refers to the all-purpose character code/Japanese-Chinese dictionary local character code (Chinese) conversion table 124*c* (A222). CPU 10 then converts the all-purpose character codes of the jump word to the corresponding Japanese-Chinese dictionary local character codes and updates the jump-destination local character code storage location 57 with the obtained local character codes (A224).

Then, CPU 10 retrieves from the Japanese-Chinese dictionary subDB 124*a* a headword matching the jump word described in the Japanese-Chinese dictionary local character codes stored at the jump-destination local character code storage location 57 and displays the headword and its corresponding explanatory description on the display device 30.

Figure 14:
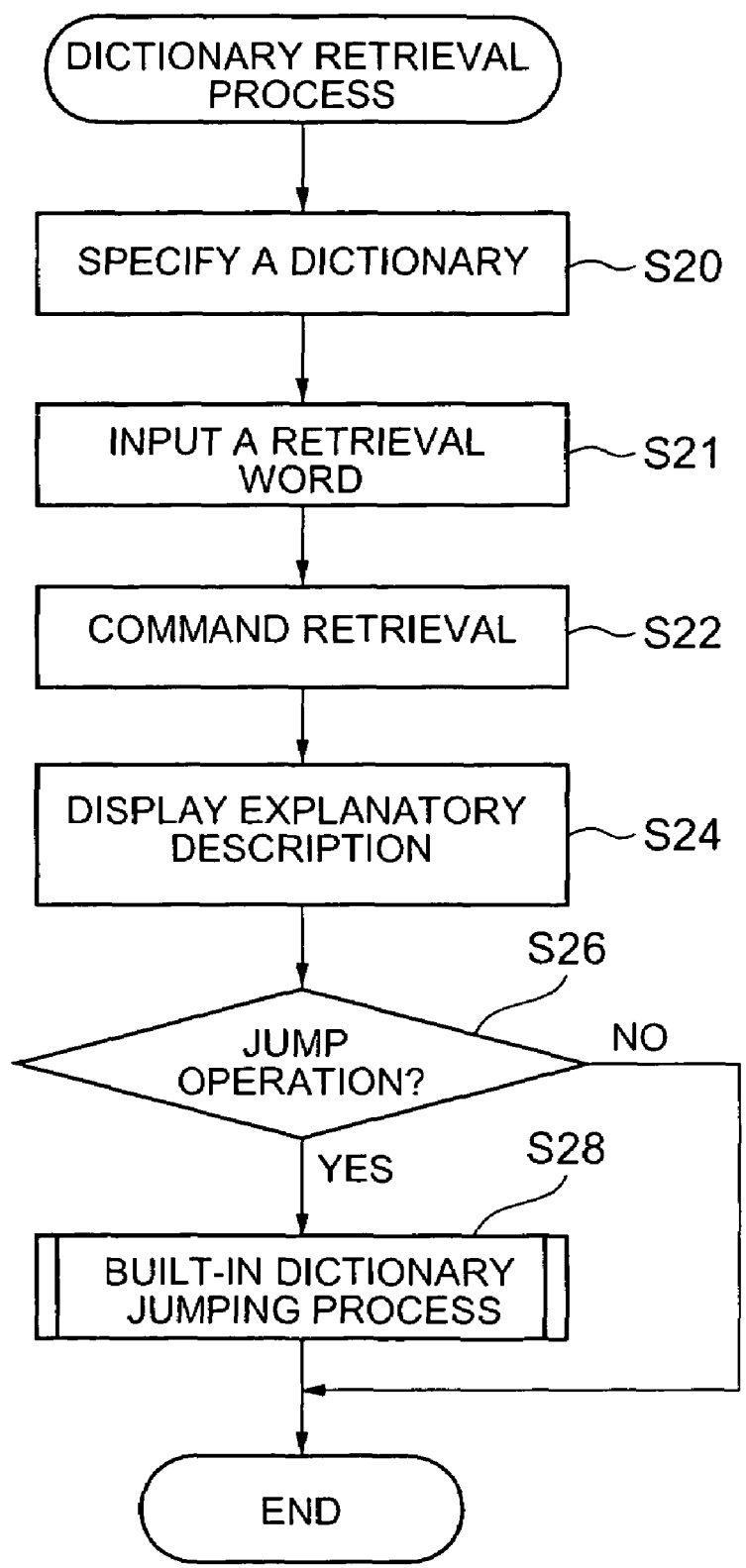
FIG. 14 illustrates a flow of a dictionary retrieving process of the electronic dictionary in the second embodiment.

Operation of the electronic dictionary 2 in the second embodiment will be described with reference to FIGS. 14-16. FIGS. 14 and 16 each illustrate flows of operation of the electronic dictionary 2. FIG. 15 illustrates a transition of pictures displayed on the display device 30.

FIG. 14 is a flowchart of the dictionary retrieval process to be performed by the electronic dictionary 2 based on the dictionary retrieval program 85. As shown, CPU 10 displays a retrieval word input picture on the display device 30. Then, the user specifies a dictionary subDB (step S20), inputs a retrieval word (step S21), and commands retrieval (step S22).

In response to the commanding of the retrieval, CPU 10 first sets the specified retrieval word as a headword, retrieves the headword from the headword data stored in the dictionary subDB specified at step S20, reads its corresponding explanatory descriptions and displays the headword and its corresponding explanatory descriptions on the display device 30 (step S24).

Figure 15A:
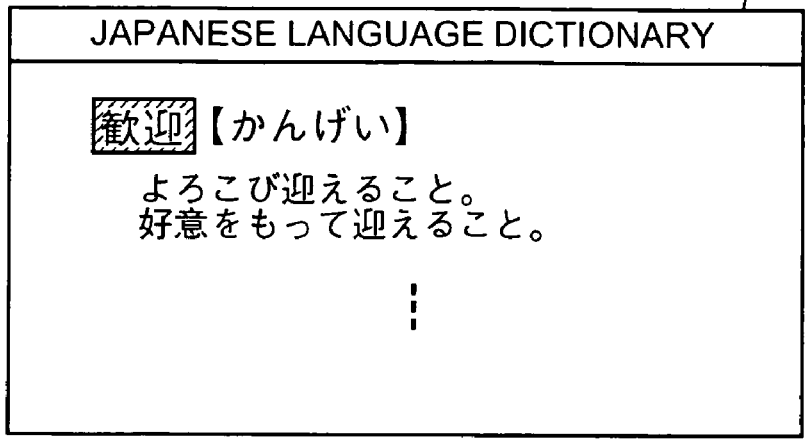
FIGS. 15A, 15B and 15C cooperatively illustrate a transition of pictures in the second embodiment.
Figure 16:
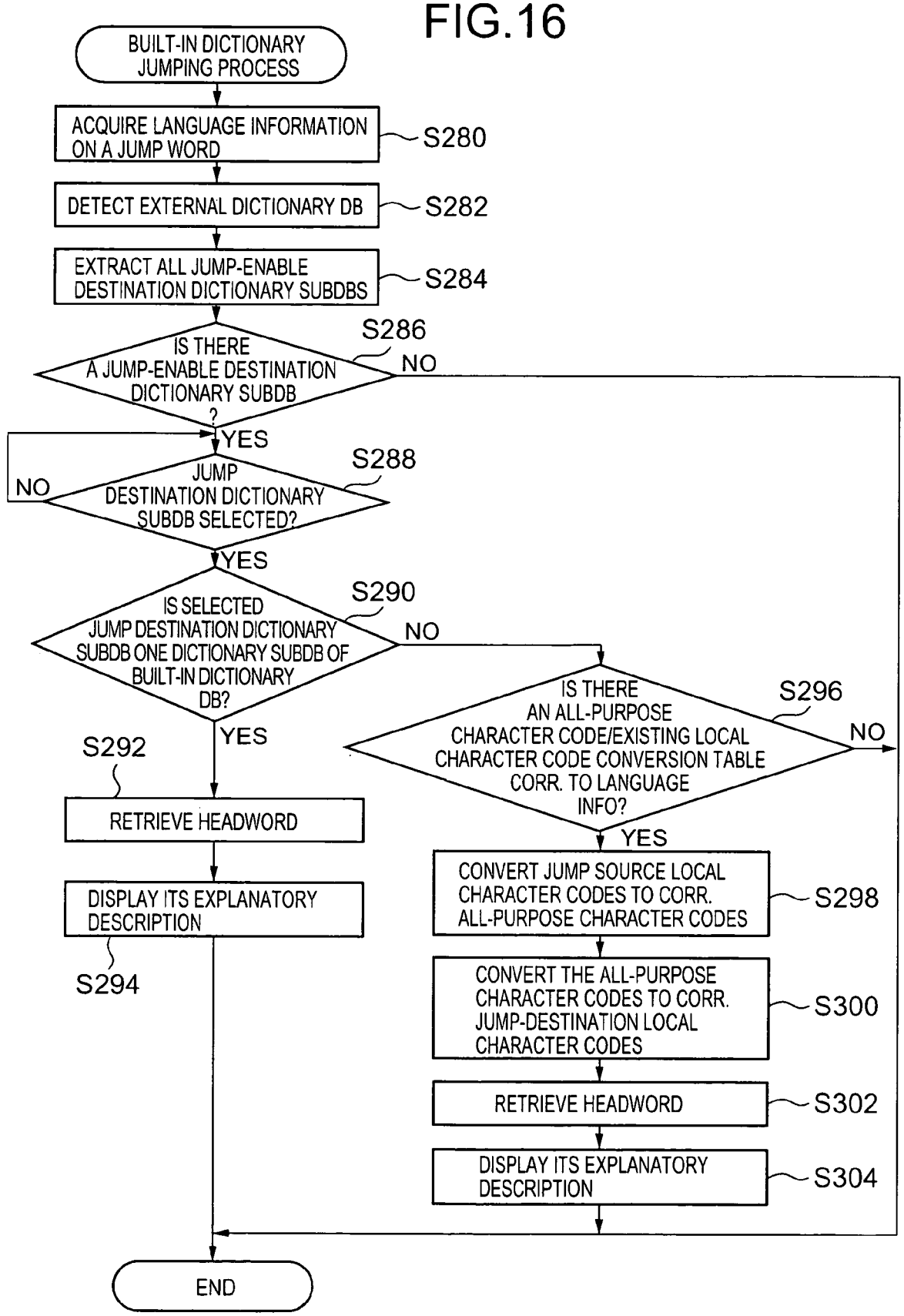
FIG. 16 illustrates a flow of a built-in dictionary jumping process of the electronic dictionary apparatus in the second embodiment.

FIG. 15A illustrates a retrieval result display picture W30 displayed on the display device 30 at this stage and when the language dictionary is specified. As shown, the headword matching the word specified as the retrieval word and its corresponding explanatory descriptions are displayed.

When a jump command is inputted (step S26), CPU 10 executes the internal dictionary jumping process (step S28).

FIG. 16 illustrates a flowchart of the internal dictionary jumping process of the electronic dictionary 2 based on the internal dictionary jumping program 85*a*. As shown, CPU 10 first reads language information on the specified jump word and updates the language information storage location 51 with this language information (step S280). CPU 10 then stores the specified jump word in the jump source local character code storage location 53.

Then, CPU 10 detects the jump-enabled destination external dictionary DB (step S282). More specifically, when an external recording medium 120 is set on the recording medium reader 40, CPU 10 detects the external dictionary DB stored in the external recording medium 120, acquires language information on the headwords stored in the dictionary subDBs of the detected external dictionary DB, and then updates the index table 83 with this language information.

Then, CPU 10 extracts all jump-enabled destination dictionary subDBs from the index table 83 based on the language information on the jump word (step S284). When the jump-enabled destination dictionary subDBs are extracted (step S286, YES), CPU 10 prompts the user to select a dictionary subDB as a jump destination. When there are no jump-enabled destination dictionary subDBs (step S286, NO), CPU 10 terminates this process.

Figure 15B:
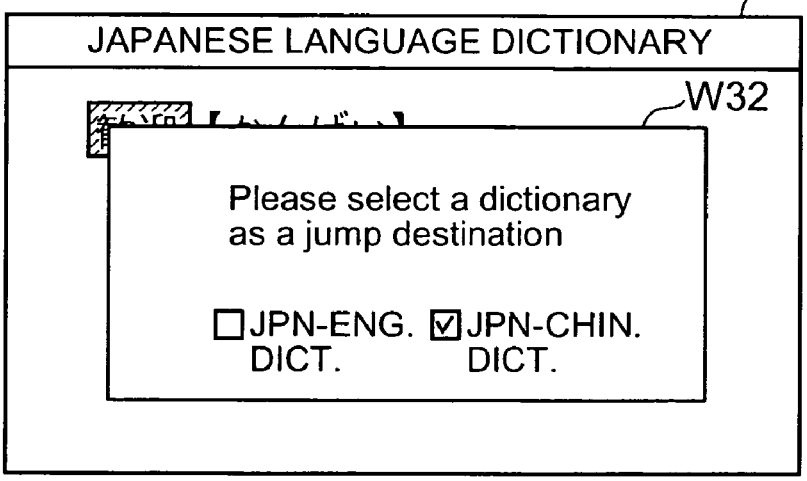

FIG. 15B illustrates a jump-destination dictionary select picture W32 displayed on the display device 30 at this stage. For example, when a word 歓迎is selected and a jump command is inputted on the retrieval result display picture W30 of FIG. 15A, a jump-destination dictionary select picture W32 is displayed on the retrieval result display picture W30, as shown in FIG. 15B. In addition, the types of jump-enabled destination dictionaries "Japanese-English dictionary" and "Japanese-Chinese dictionary" extracted based on the language information "Japanese" on the jump word 歓迎are displayed selectably on the jump destination dictionary select picture W32.

When the jump destination dictionary subDB is selected (step S288, YES) and this selected dictionary subDB is one of the dictionary DBs of the built-in dictionary DB 81 (step S290, YES), CPU 10 retrieves a headword matching the jump word from the headword data stored in the selected dictionary subDB (step S292), displays the headword and its corresponding explanatory descriptions on the display device 30 (step S294), and then terminates this process.

When the selected jump-destination dictionary subDB is not one of the dictionary DBs of the built-in dictionary DB 81, but one of the external dictionary DBs (step S290, NO), CPU 10 detects an all-purpose character code/existing local character code conversion table for the language information on the jump word (step S296, YES), refers to the detected all-purpose character code/existing local character code conversion table to thereby convert the existing local character codes stored at the jump source local character code storage location 53 to the corresponding all-purpose character codes, and updates the all-purpose character code storage location 55 with the obtained all-purpose character codes (step S298). When there is no all-purpose character code/existing local character code conversion table for the language information on the jump word (step S296, NO), CPU 10 terminates this process.

CPU 10 converts the all-purpose character codes stored in the all-purpose character code storage location 55 to the corresponding local character codes of the external dictionary DB specified as the jump destination, and then updates the jump-destination local character code storage location 57 with the obtained local character codes (step S300).

More specifically, when the external "Chinese-Japanese dictionary subDB 122 is selected as the jump destination, CPU 10 refers to an all-purpose character code/Chinese-Japanese dictionary local character code conversion table for the language information of the jump word to thereby convert the all-purpose character codes to which the jump word is converted to the corresponding Chinese-Japanese dictionary local character codes. When the external "Japanese-Chinese dictionary DB 124 is selected as the jump destination, CPU 10 refers to an all-purpose character code/Japanese-Chinese dictionary local character code conversion table for the language information of the jump word to thereby convert the all-purpose character codes to which the jump word is converted to the corresponding Japanese-Chinese dictionary local character codes.

Then, CPU 10 retrieves a headword matching the jump word from the headword data stored in the external dictionary DB (step S302), displays the headword and its corresponding explanatory description on the display device 30 (step S304), and then terminates this process.

Figure 15C:
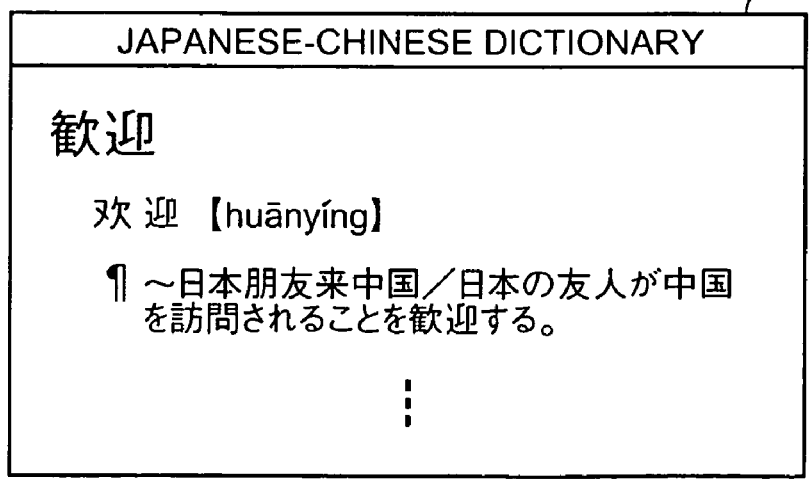

When, for example, the dictionary type "Japanese-Chinese dictionary" is selected on the jump-destination dictionary select picture W32 of FIG. 15B, a jump is made from "Japanese language dictionary" to "Chinese-Japanese dictionary" to thereby present a retrieval result display picture W34 that displays the jump word 歓迎 and its corresponding explanatory description read from the "Japanese-Chinese dictionary subDB 124*a*", as shown in FIG. 15C.

As described above, according to the second embodiment, when the external recording medium 120 is set on the recording medium reader 40 the external dictionary DB stored on the external recording medium 120 is detected, language information on the headwords stored in the dictionary subDB of the detected external dictionary DB is acquired, and then the index table 83 is updated with the language information. Thus, a jump-enabled destination dictionary subDB can be detected based on the language information on the specified jump word.

When a jump is made in which a word contained in the explanatory description stored in a dictionary subDB of the built-in internal dictionary DB 81 and described in the existing local character codes is specified as a jump word, the existing local character codes that describe this jump word are temporarily converted to the corresponding all-purpose character codes based on the all-purpose character code/existing local character code conversion table for the language information on the jump word. Further, the all-purpose character codes of the jump word are converted appropriately to the corresponding local character codes of the specified external dictionary DB. Then, the headword is retrieved. Therefore, a jump can be made from the dictionary subDB of the built-in dictionary DB 81 described in a type of local character codes to the external dictionary DB described in a different type of local character codes.

Since the external dictionary DB comprises a conversion table on which the local character codes and the all-purpose character codes are placed in corresponding relationship for a respective one of the languages of the words contained in the headwords and explanatory descriptions stored in the dictionary subDB of each external dictionary DB. Thus, a jump can be made between the external dictionaries DB described in different local character codes. Therefore, the ease of using the jumping function of the electronic dictionary 1 is improved.

Since the external dictionary DB stored in the external recording medium 120 is detected and the index table 83 is then updated, a word contained in the explanatory description stored in the external dictionary DB can be specified as a jump word, and a jump can be made to another external dictionary DB.

More specifically, in response to the jumping operation in which a word contained in the explanatory description stored in the Japanese-Chinese dictionary subDB 124*a* was specified as a jump word, CPU 10 detects as a jump-enable destination dictionary subDB the "Chinese-Japanese dictionary sub DB 122*a*" in which headwords and language information "Chinese" are placed in corresponding relationship when the language information corresponding to the jump word is, for example, "Chinese".

While in the embodiment the case in which the external recording medium that has stored the dictionary DBs are set in the electronic dictionary has been illustrated, the electronic dictionary may comprise a communications device that downloads the external dictionary DBs from an external electronic apparatus through communications lines. In that case, a jump may be made from the displayed downloaded dictionary data to the built-in dictionary DB of the electronic dictionary. This also applies in the use of dictionary DBs stored in CD-ROMS adapted to be set on personal computers.

While in the embodiment the electronic dictionaries comprising the general dictionaries and electronic encyclopedias have been illustrated, the present invention is not limited to these manufactured articles. The present invention is also applicable to general electronic apparatus such as cellular phones, personal computers, and electronic timepieces. The electronic dictionary data may be stored on memory cards, CDs, etc., adapted to be set on the electronic dictionary.

Various modifications and changes may be made thereunto without departing from the broad spirit and scope of this invention. The above-described embodiments are intended to illustrate the present invention, not to limit the scope of the present invention. rather than the embodiments. Various modifications made within the meaning of an equivalent of the claims of the invention and within the claims are to be regarded to be in the scope of the present invention.

This application is based on Japanese Patent Application No. 2002-380755 filed on Dec. 27, 2002 and including specification, claims, drawings and summary. The disclosure of the above Japanese patent application is incorporated herein by reference in its entirety.

What is claimed is:

1. An information display control apparatus comprising:
   a first dictionary information storage section which stores a plurality of headwords and respective explanatory descriptions of the plurality of headwords in a corresponding relationship, such that each headword and the respective explanatory description thereof is described in a first local character code;
   a first conversion table storage section which stores a first character code conversion table that performs conversion between the first local character code and a general-purpose character code;
   a second dictionary information storage section which stores a plurality of headwords and respective explanatory descriptions of the plurality of headwords in a corresponding relationship, such that each headword and the respective explanatory description thereof is described in a second local character code;

a second conversion table storage section which stores a second character code conversion table that performs conversion between the second local character code and the general-purpose code;

a retrieval object input section via which an object to be retrieved is input;

a first explanatory description display control section which retrieves a headword from the first dictionary information storage section that corresponds to the inputted object and which displays the explanatory description corresponding to the retrieved headword;

a retrieval object specifying section which specifies, as an object for retrieval, any particular word contained in the explanatory description displayed by the first explanatory description display control section, said explanatory description being in the first local character code;

a first code conversion section which converts the first local character code, which describes the object for retrieval specified by the retrieval object specifying section, into the general-purpose code in accordance with the first character code conversion table;

a second code conversion section which converts the general-purpose code from the first code conversion section into the second local character code in accordance with the second character code conversion table; and a second explanatory description display control section which retrieves a headword from the second dictionary information storage section that corresponds to the object for retrieval, as described in the second local character code from the second code conversion section, and which displays the explanatory description corresponding to the retrieved headword in the second local character code;

wherein the first dictionary information storage section and the first conversion table storage section are provided on a disconnectable external storage unit which is disconnectably attached to the information display control apparatus;

wherein each of the first and second dictionary information storage sections stores respective language information for each of the headwords and explanatory descriptions, so as to identify languages of the headwords and explanatory descriptions; and wherein the apparatus further comprises a language difference information display section which, when the language information corresponding to the word specified as the object for retrieval by the retrieval object specifying section is different from the language information of the headwords in the second dictionary information storage section, displays on a display a notification that the language information of the word specified as the object for retrieval and the language information of the headwords in the second dictionary information storage section are different.

2. The apparatus of claim 1, wherein the second dictionary information storage section and the second conversion table storage section are provided on the disconnectable external storage unit.

3. The apparatus of claim 1, wherein the second dictionary information storage section stores a plurality of dictionaries, each storing a plurality of headwords and respective explanatory descriptions of the plurality of headwords in a corresponding relationship, such that in each of the dictionaries the headwords and the respective explanatory descriptions are described in a respective different second local character code;

wherein the second conversion table storage section stores a plurality of second character code conversion tables, each of which performs conversion between a respective one of the different second local character codes and the general-purpose code;

wherein the apparatus further comprises a dictionary selecting section for selecting one of the plurality of different dictionaries in accordance with an instruction from a user;

wherein the second code conversion section converts the general-purpose code from the first code conversion section into the respective second local character code corresponding to the selected dictionary, in accordance with the second character code conversion table corresponding to the selected dictionary; and wherein the second explanatory description display control section retrieves the headword corresponding to the object of retrieval from the selected dictionary of the second dictionary information storage section, and displays the explanatory description from the selected dictionary corresponding to the retrieved headword in the respective second local character code of the selected dictionary.

4. A computer readable recording medium having a computer readable program stored thereon that is executable by a computer to cause the computer to perform functions comprising:

receiving an input of a retrieval object;

accessing a first dictionary information storage section which stores a plurality of headwords and respective explanatory descriptions of the plurality of headwords in a corresponding relationship, such that each headword and the respective explanatory description thereof is described in a first local character code, and retrieving a headword from the first dictionary information storage section that corresponds to the input inputted object;

displaying the explanatory description corresponding to the retrieved headword;

receiving a specification of, as an object for retrieval, any particular word contained in the displayed explanatory description, said explanatory description being in the first local character code;

converting the first location character code, which describes the specified object for retrieval, into a general-purpose character code in accordance with a first character code conversion table that performs conversion between the first local character code and the general-purpose character code;

converting the general-purpose code into a second local character code in accordance with a second character code conversion table that performs conversion between the second local character code and the general-purpose character code;

accessing a second dictionary information storage section which stores a plurality of headwords and respective explanatory descriptions of the plurality of headwords in a corresponding relationship, such that each headword and the respective explanatory description thereof is described in a second local character code, and retrieving a headword from the second dictionary information storage section that corresponds to the object for retrieval, as described in the second local character code; and displaying the explanatory description corresponding to the retrieved headword in the second local character code;

wherein the first dictionary information storage section and the first conversion table are provided on a disconnectable external storage unit which is disconnectably attached to the computer;

wherein each of the first and second dictionary information storage sections stores respective language information for each of the headwords and explanatory descriptions, so as to identify languages of the headwords and explanatory descriptions; and wherein when the language information corresponding to the word specified as the object for retrieval is different from the language information of the headwords in the second dictionary information storage section, the computer is caused to display on a display a notification that the language information of the word specified as the object for retrieval and the language information of the headwords in the second dictionary information storage section are different.

* * * * *